United States Patent
Poirot-Crouvezier

(10) Patent No.: US 10,797,326 B2
(45) Date of Patent: Oct. 6, 2020

(54) HIGH-TEMPERATURE PROTON EXCHANGE MEMBRANE ELECTROCHEMICAL REACTOR SUITABLE FOR LOW-TEMPERATURE STORAGE

(71) Applicant: Commissariat a l'energie atomique et aux energies alternatives, Paris (FR)

(72) Inventor: Jean-Philippe Poirot-Crouvezier, Saint-Georges de Commiers (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 109 days.

(21) Appl. No.: 16/211,774

(22) Filed: Dec. 6, 2018

(65) Prior Publication Data

US 2019/0181462 A1 Jun. 13, 2019

(30) Foreign Application Priority Data

Dec. 13, 2017 (FR) ..................... 17 62067

(51) Int. Cl.
- *H01M 8/0276* (2016.01)
- *H01M 8/0267* (2016.01)
- *H01M 8/0247* (2016.01)
- *H01M 8/2483* (2016.01)
- *H01M 8/1004* (2016.01)
- *H01M 8/0273* (2016.01)

(Continued)

(52) U.S. Cl.
CPC ......... *H01M 8/0276* (2013.01); *H01M 8/028* (2013.01); *H01M 8/0247* (2013.01);

(Continued)

(58) Field of Classification Search
None
See application file for complete search history.

(56) References Cited

U.S. PATENT DOCUMENTS

| 6,423,439 B1* | 7/2002 | Barton | H01M 8/0271 429/509 |
| 7,759,014 B2* | 7/2010 | Wakahoi | H01M 8/0263 429/457 |

(Continued)

FOREIGN PATENT DOCUMENTS

| FR | 2 997 562 A1 | 5/2014 |
| WO | WO 2013/132843 A1 | 9/2013 |

OTHER PUBLICATIONS

French Preliminary Search Report dated Jul. 18, 2018 in French Application 17 62067 filed on Dec. 13, 2017 (with English Translation of Categories of Cited Documents and Written Opinion).

*Primary Examiner* — Rena Dye Cronin
(74) *Attorney, Agent, or Firm* — Oblon, McClelland, Maier & Neustadt, L.L.P.

(57) ABSTRACT

An electrochemical reactor, including a flow guide; a membrane/electrode assembly; a peripheral seal; an intermediate seal encircled by the peripheral seal and encircling a reaction zone of the electrochemical reactor; a first flow circuit for cooling fluid arranged between the peripheral seal and the intermediate seal, including a first flow channel extending along the peripheral seal; a second flow channel extending along the intermediate seal; and a third flow channel connecting the respective second ends of the first and second flow channels, so that a fluid introduced at the level of the first manifold must pass through the third flow channel to return to the second manifold.

13 Claims, 4 Drawing Sheets

(51) Int. Cl.
    *H01M 8/1007*     (2016.01)
    *H01M 8/028*     (2016.01)
    *H01M 8/0263*     (2016.01)

(52) U.S. Cl.
    CPC ....... *H01M 8/0263* (2013.01); *H01M 8/0267* (2013.01); *H01M 8/0273* (2013.01); *H01M 8/0278* (2013.01); *H01M 8/1004* (2013.01); *H01M 8/1007* (2016.02); *H01M 8/2483* (2016.02)

(56) References Cited

U.S. PATENT DOCUMENTS

| | | | |
|---|---|---|---|
| 9,966,613 B2 * | 5/2018 | Olsommer | H01M 8/0258 |
| 2005/0079400 A1 * | 4/2005 | Sugiura | H01M 8/0258 |
| | | | 429/483 |
| 2005/0089737 A1 * | 4/2005 | Dave | H01M 8/0271 |
| | | | 429/435 |
| 2005/0112445 A1 | 5/2005 | Trabold | |
| 2005/0249996 A1 | 11/2005 | Meacham | |
| 2006/0110651 A1 | 5/2006 | Wakahoi et al. | |
| 2009/0004522 A1 * | 1/2009 | Rock | H01M 8/2457 |
| | | | 429/508 |
| 2009/0042075 A1 | 2/2009 | Nakanishi et al. | |
| 2009/0075154 A1 * | 3/2009 | Madeleine | H01M 8/0271 |
| | | | 429/413 |
| 2010/0239931 A1 * | 9/2010 | Ishida | H01M 8/0265 |
| | | | 429/434 |
| 2015/0064590 A1 | 3/2015 | Numao et al. | |
| 2015/0280254 A1 | 10/2015 | Olsommer | |
| 2016/0285113 A1 * | 9/2016 | Di Iorio | H01M 8/0282 |

\* cited by examiner

HIGH-TEMPERATURE PROTON EXCHANGE MEMBRANE ELECTROCHEMICAL REACTOR SUITABLE FOR LOW-TEMPERATURE STORAGE

The invention relates to proton exchange membrane electrochemical reactors, such as electrolysers for producing dihydrogen by electrolysis of water, or fuel cells for producing electricity.

Proton exchange membrane electrochemical reactors are used at an operating temperature below 300° C. The proton exchange membrane forms a solid electrolyte. Membranes of the polybenzimidazole type impregnated with phosphoric acid are generally used for low-temperature applications.

In particular, a fuel cell usually includes a stack of elementary cells in which an electrochemical reaction takes place between two reactants that are introduced continuously. The fuel is supplied to the anode contact, and the combustion agent is brought to the cathode contact.

The reaction is split into two half-reactions, which take place on the one hand at the anode/membrane interface and on the other hand at the cathode/membrane interface. The half-reactions can only take place if there is an ionic conductor between the two electrodes and an electron conductor.

The fluids are brought into contact with the reaction zones from input and output manifolds that generally pass right through the stack. The fluids are generally guided between a manifold and their reaction zone by flow channels of a bipolar plate, which also has a function of electrical conduction and a function of transmission of a clamping force of the stack of cells. Each manifold is surrounded by a seal preventing mixing of the various fluids circulating in the fuel cell. Each cell is provided with means for injection through the seals for conveying the fluid in question from the manifold to the reaction zone.

A peripheral seal is arranged at the periphery of each bipolar plate and thus encircles a median part of the stack including the reaction zone and the flow manifolds. This peripheral seal ensures hermeticity of the various flow circuits between one another and with respect to the exterior.

A fuel cell of this kind therefore employs at least two different types of seals: the peripheral seals and the seals encircling the flow manifolds.

Depending on the intended application, a fuel cell must meet precise specifications in terms of permissible temperatures:
  operation of the fuel cell must be possible over a given temperature range, for example from 100° C. to 200° C.;
  storage of the fuel cell must be possible over a temperature range for example from −55° C. to +70° C., this temperature range therefore being quite different from the operating temperature range. Over this temperature range, the peripheral seal must still guarantee hermeticity to prevent contamination of the interior of the fuel cell.

Even in a very cold environment, the internal temperature of the fuel cell is regulated to its usual operating temperature, as the thermal losses of the electrochemical reaction are far greater than the heat exchanges at its periphery. Therefore an internal temperature of the fuel cell is only below its usual operating temperature when it is not in operation: during phases of stoppage, storage, or maintenance, for example.

For the example given above, taking into account the constraints on operation and storage mentioned above, hermeticity of the peripheral seal must be ensured over the entire temperature range from −55° C. to +200° C. This constraint greatly reduces the technological choices available for this peripheral seal. In fact, a certain number of seal materials usable at the operating temperature of the fuel cell become rigid at low temperature. The seals then no longer compensate the differences in expansion of the various components or the defects of shape, resulting in imperfect hermeticity.

The invention aims to solve one or more of these drawbacks. The invention thus relates to an electrochemical reactor, as defined in the accompanying claims.

A person skilled in the art will understand that each of the features of the variants of an independent claim may be combined independently with the features of a dependent claim or of the description, without thereby constituting an intermediate generalization.

The invention also relates to a system as defined in the accompanying claims.

Other features and advantages of the invention will become clear from the description thereof that is given hereunder, as a guide and not in any way limiting, referring to the appended drawings, in which.

Figure 1:
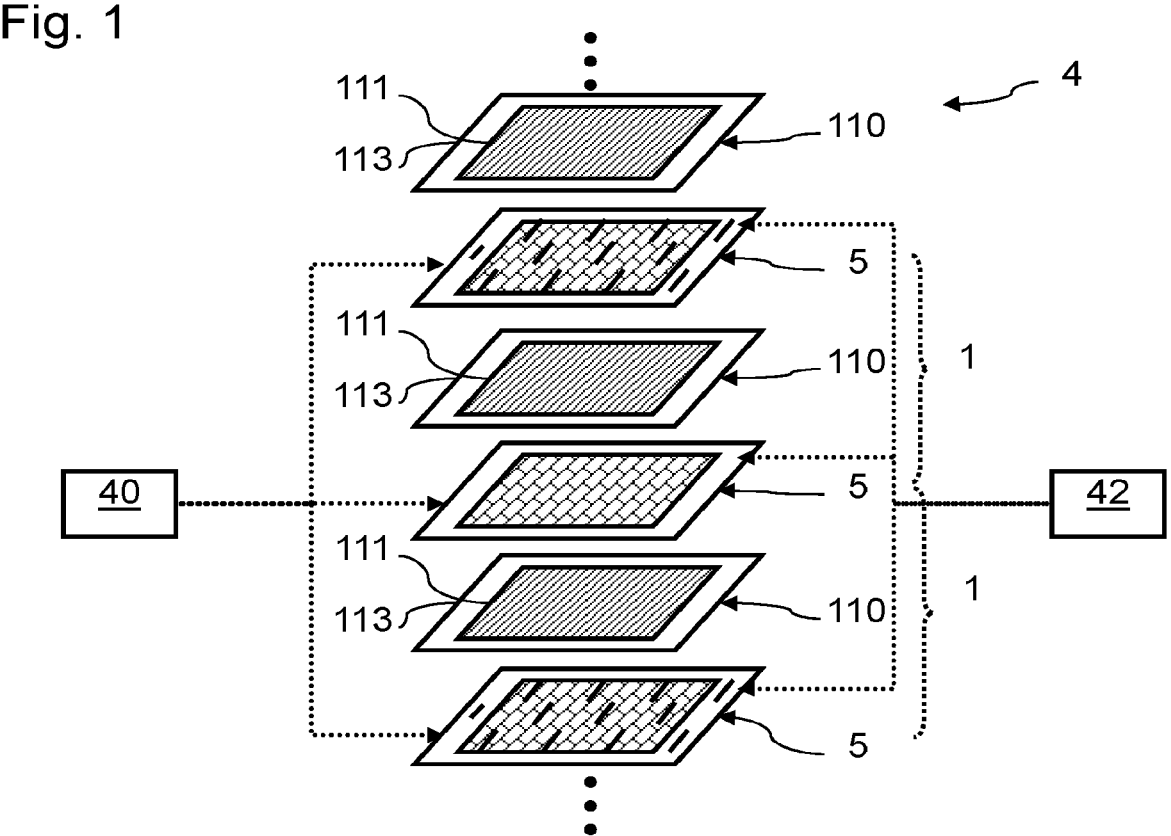
FIG. 1 is an exploded perspective view of an example of a stack of membrane/electrode assemblies and of bipolar plates for a fuel cell.

FIG. 1 is a schematic exploded perspective view of a stack of cells 1 of a fuel cell 4. The fuel cell 4 comprises several superposed cells 1. The cells 1 are of the type with a proton exchange membrane or polymer electrolyte membrane.

The fuel cell 4 comprises a fuel source 40. The fuel source 40 in this case supplies dihydrogen to an inlet of each cell 1. The fuel cell 4 also comprises a source of combustion agent 42. The source of combustion agent 42 in this case supplies air to an inlet of each cell 1, the oxygen of the air being used as an oxidant. Each cell 1 also comprises exhaust channels. One or more cells 1 also have a cooling circuit of the reaction zone.

Each cell 1 comprises a membrane/electrode assembly 110 or MEA 110. A membrane/electrode assembly 110 comprises a solid electrolyte 113, a cathode (not shown) and an anode 111 placed on either side of the electrolyte and fixed on this electrolyte 113. The layer of electrolyte 113 forms a membrane allowing proton conduction while being impermeable to the gases present in the cell. The layer of electrolyte also prevents passage of the electrons between the anode 111 and the cathode. The electrolyte 113 is in this case configured for being used at an operating temperature above 100° C., typically an operating temperature of 180° C. An electrolyte 113 of this kind may for example be made of polybenzimidazole (PBI) doped with phosphoric acid.

A bipolar plate 5 is arranged between each pair of adjacent MEAs. On each face of an MEA, a bipolar plate 5 forms a guide for flow of reactant. Here, each bipolar plate 5 defines anodic flow channels and cathodic flow channels on opposite outer faces. Bipolar plates 5 also define flow channels for liquid coolant between two successive membrane/electrode assemblies. The bipolar plates 5 may each be formed in a manner known per se from two assembled conductive metal sheets, for example made of stainless steel, or of titanium alloy, aluminium alloy, nickel alloy or tantalum alloy. Each sheet then defines a respective outer face. The bipolar plates 5 may also be obtained by any other method, for example moulding or injection moulding starting from carbon-polymer composites. The bipolar plates 5 may thus also be formed in one piece. The outer faces of the bipolar plate 5 are then defined by a single-piece component of this kind. Each cell 1 may further comprise a gas diffusion layer (not shown) arranged between the anode and a bipolar plate, and another gas diffusion layer arranged between the cathode and another bipolar plate. The membrane/electrode assemblies 110 may comprise reinforcements, which are not illustrated here.

In a manner known per se, during operation of the fuel cell 4, air flows between an MEA 110 and a bipolar plate 5, and dihydrogen flows between this MEA 110 and another bipolar plate 5. The bipolar plates 5 notably have a function of guiding the flow of the reactants on either side of the MEA 110. At the anode, the dihydrogen is ionized, producing protons that cross the MEA 110. The electrons produced by this reaction are collected by a bipolar plate 5. The electrons produced are then applied on an electrical load connected to the fuel cell 4 to form an electric current. At the cathode, the oxygen is reduced and reacts with the protons to form water. The following reactions take place at the anode and the cathode:

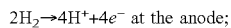

$2H_2 \rightarrow 4H^+ + 4e^-$ at the anode;

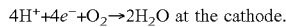

$4H^+ + 4e^- + O_2 \rightarrow 2H_2O$ at the cathode.

When it is in operation, a cell 1 of the fuel cell 4 usually generates a DC voltage between the anode and the cathode of the order of 1 V.

The source of combustion agent 42 typically comprises a compressor for introducing air at a given pressure into the inlet of the cells 1. Such a compressor receives for example a set value of air pressure, and the air pressure can be regulated by means of variable rotary speed of the compressor.

The stack of the bipolar plates 5 and membrane/electrode assemblies 110 is intended to form a plurality of flow manifolds. For this purpose, respective holes are made through the bipolar plates 5 and through the membrane/electrode assemblies 110. The holes in the bipolar plates 5 and in the membrane/electrode assemblies 110 are arranged opposite one another to form the various flow manifolds.

Figure 2:
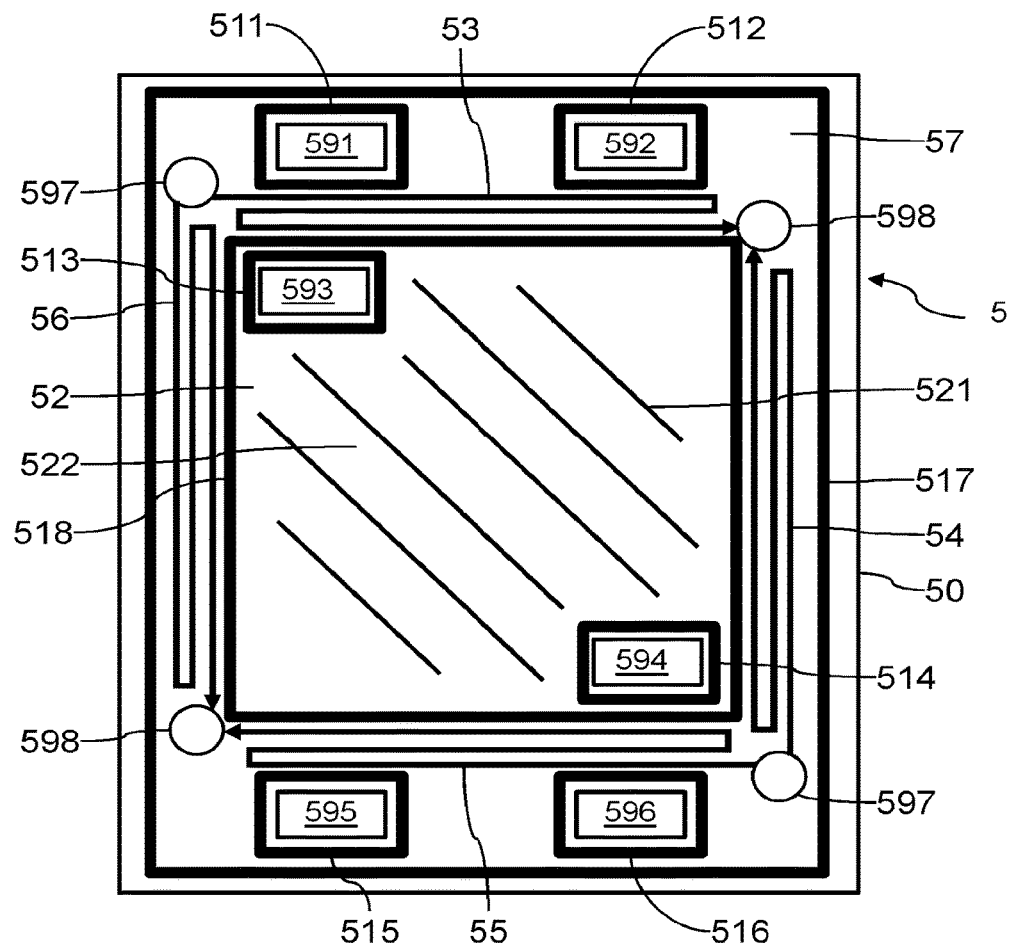
FIG. 2 is a view of a bipolar plate of a fuel cell according to one embodiment of the invention, provided with seals.

FIG. 2 is a schematic top view of a bipolar plate 5 given as an example, for a fuel cell according to one embodiment of the invention. A sheet 50 of the bipolar plate 5 is thus illustrated in top view, provided with various seals. The seals are pressed against an MEA 110, not illustrated in this figure.

The bipolar plates 5 thus comprise holes 591 and 592 at the level of a first lengthwise end, and holes 595 and 596 at the level of a second lengthwise end. In a median zone 52, the bipolar plates 5 comprise a hole 593 near the holes 591 and 592, and a hole 594 near the holes 595 and 596. The holes 591 to 596 are encircled by seals 511 to 516 respectively.

Hole 591 serves for example for forming a fuel supply manifold, and hole 596 serves for example for forming a manifold for evacuating combustion residues and unused fuel. Hole 593 serves for example for forming a manifold for supplying liquid coolant for the median zone 52, and hole 594 serves for example for forming a manifold for evacuating this liquid coolant. Hole 592 serves for example for forming a manifold for supplying the combustion agent, and hole 595 serves for example for forming a manifold for evacuating water produced and unused combustion agent.

The median zone 52 corresponds roughly to a reaction zone of the fuel cell. The median zone 52 comprises flow channels 522, shown schematically, for example anodic flow channels delimited by walls 521.

A peripheral seal 517 encircles all of the holes or manifolds 591 to 596 and the median part 52. A seal 518 encircles the median part 52. An intermediate zone 57 is thus provided between the seals 517 and 518, with the holes 591, 592, 595 and 596 passing through the intermediate zone 57. The seals 511 to 518 are compressed between a sheet 50 of the bipolar plate 5 and an MEA.

In the example illustrated, the bipolar plate 5 has substantially a rectangular shape. Here, the seals 517 and 518 also have a rectangular shape, which will be used for describing in detail a simple configuration of the invention.

In the intermediate zone 57, flow circuits 53 to 56 for a cooling fluid or heat-transfer fluid are provided between the seals 517 and 518. In particular:

the cooling fluid flow circuit 53 is provided between parallel sides of the seals 517 and 518. Flow circuit 53 connects a manifold for admission of cooling fluid 597 to a manifold for discharge of cooling fluid 598;

the cooling fluid flow circuit 54 is provided between other parallel sides of the seals 517 and 518. Flow circuit 54 connects a manifold for admission of cooling fluid 597 to a manifold for discharge of cooling fluid 598;

the cooling fluid flow circuit 55 is provided between other parallel sides of the seals 517 and 518. Flow circuit 55 connects a manifold for admission of cooling fluid 597 to a manifold for discharge of cooling fluid 598;

the cooling fluid flow circuit 56 is provided between other parallel sides of the seals 517 and 518. Flow circuit 56 connects a manifold for admission of cooling fluid 597 to a manifold for discharge of cooling fluid 598. The manifolds for cooling fluid 597 and 598 are encircled by seals, not shown here, for the sake of clarity. A pump or a compressor (depending on the nature of the cooling fluid), not illustrated, makes it possible to introduce the cooling fluid at the level of manifolds 597 and withdraw this fluid at the level of manifolds 598.

The cooling fluid flow circuits 53, 54, 55 and 56 are configured to form a thermal gradient between the peripheral seal 517 and the intermediate seal 518, when the fuel cell 4 is in operation.

Each of the flow circuits 53 to 56 comprises on the one hand a flow channel extending along the peripheral seal 517, on the other hand a flow channel extending along the intermediate seal 518, and another flow channel joining the latter.

Figure 3:
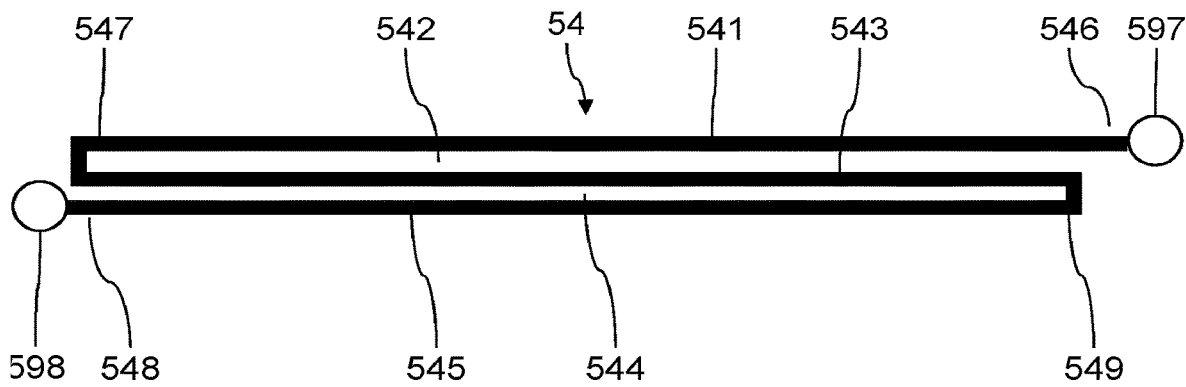
FIG. 3 illustrates schematically an intermediate cooling circuit of FIG. 2.

The schematic configuration of the flow circuit 54 is illustrated in FIG. 3. The flow circuit 54 comprises a flow channel 541, having a first end 546 connected to a manifold for admission of cooling fluid 597, and a second end 547 opposite to end 546. The flow channel 541 extends parallel to one side of the peripheral seal 517, so that it is adjacent to the latter.

The flow circuit 54 also comprises a flow channel 545, having a first end 548 connected to a manifold for exhaust of cooling fluid 598, and a second end 549 opposite to end 548. The flow channel 545 extends parallel to one side of the intermediate seal 518, so that it is adjacent to the latter.

The flow circuit 54 also comprises a flow channel 543, connecting end 547 to end 549. The flow channel 543 is separated from the flow channel 541 by a wall 542. The wall 542 notably prevents the flow passing directly from end 546 to end 549. The flow channel 543 is separated from the flow channel 545 by a wall 544. The wall 544 notably prevents the flow passing directly from end 547 to end 548. Thus, when a fluid is introduced at the level of manifold 597, it must pass through the flow channel 541 and along the peripheral seal 517, pass through the flow channel 543, and then pass through flow channel 545 along the intermediate seal 518 to reach the exhaust manifold 598. The directions of flow in the flow circuits 53 to 56 are illustrated by the arrows in FIG. 2.

In this configuration, forcing the cooling fluid to pass through the flow channel 543 guarantees a temperature gradient between the flow channel 541 along the peripheral seal 517, and the flow channel 545 along the intermediate seal 518.

In particular, the flow manifolds for cooling fluid are connected to a cooling circuit and an injection circuit. The cooling circuit is notably configured for cooling the cooling fluid taken at the level of a manifold 598 via an exchanger, and configured for conveying this cooling fluid from the exchanger to manifold 597.

Thus, a cooling fluid is introduced at low temperature into the cooling circuits 53 to 57 via the manifolds 597. The cooling fluid passes through the flow channels running along seal 517, and thus cool seal 517 to keep it at the temperature within the range of use of the material from which it is made. The seal 517 thus maintains its properties of hermeticity even when the fuel cell 4 is in operation.

The peripheral seal 517 and the intermediate seal 518 advantageously consist of different materials, having different temperature ranges of use. The material of peripheral seal 517 includes for example a temperature of −20° C. in its range of use, or even −60° C. in its range of use, so as to be able to store the fuel cell 4 at low temperature, without any problem of hermeticity with respect to the environment. The material of intermediate seal 518 includes for example a temperature of 180° C. in its range of use, or even a temperature of 200° C. in its range of use. Such a temperature corresponds to an operating temperature of certain high-temperature fuel cells. The operating temperature of the fuel cell 4 will for example have to be above the glass transition temperature of seal 518, and below its temperature of destruction.

The invention thus proves particularly suitable for electrochemical reactors operating at a temperature above 100° C., for which the operating temperature is therefore very different from the storage temperature for which these electrochemical reactors must be dimensioned.

In the example, several flow circuits 53 to 56 are used, which makes it possible to increase the uniformity of the temperature of the cooling fluid around seal 518 relative to a single flow circuit. This temperature uniformity promotes operation of the electrochemical reactions in the median zone 52.

The invention thus allows seals 517 and 518 to be made of different materials, having different temperature ranges of use. Thus, a larger number of materials is available on the one hand for seal 517, and on the other hand for seal 518. This notably gives more technological choices for seals 517 and 518, in order to meet requirements on chemical compatibility, mechanical properties, or product life. Seals 511, 512, 515 and 516 are advantageously made of the same material as seal 517.

As illustrated in FIG. 2, advantageously:
- manifolds 597 are closer to the peripheral seal 517 than to the intermediate seal 518. The seals surrounding the manifolds 597 are thus not heated excessively during operation of the fuel cell 4. It is optionally possible to envisage positioning the manifolds 517 in lateral projections of the bipolar plate 5;
- manifolds 598 are closer to the intermediate seal 518 than to the peripheral seal 517. The seals surrounding the manifolds 598 are thus not cooled excessively during operation of the fuel cell 4.

Advantageously, flow circuits 53 to 56 are configured to have a cumulative length of the segments along seal 517 (segments extending from an end connected to a manifold 597 to an opposite end) extending over at least 60% of the length of the peripheral seal. Such a dimension makes it possible to guarantee optimum cooling of the seal 517 to guarantee its hermeticity.

The manifolds 598 are advantageously encircled by seals made of the same material as the intermediate seal 518.

As a function of the material selected for seals 518, and if applicable seals 513, 514 and the seals of the manifold 598, the latter may prove not to be impervious at a very low storage temperature of the fuel cell 4. The fuel cell 4 does not, however, present a risk of external pollution, owing to the presence of seal 517, for which this temperature is within its range of use.

To overcome this possible problem of lack of hermeticity of these seals at low temperature, either it may be envisaged that the cooling fluid circulating in circuits 53 to 56 is compatible with the other flow circuits, namely the flow circuits for reactants or the flow circuits for other heat-transfer fluids. This cooling fluid may for example be air or water. The use of air as the cooling fluid advantageously makes it possible to collect any escapes of combustion agent at the periphery of the median zone 52. Depleted air recovered at the level of an exhaust manifold (typically including between 8 and 12% of said oxygen) proves particularly suitable, owing to the low risk of ignition with an escape of dihydrogen fuel.

If the cooling fluid is in practice incompatible with the fluid that has to pass through the other flow channels with which it may accidentally communicate if there is lack of hermeticity, preparation for storage of the fuel cell 4 may be envisaged that includes:
previous purge of this cooling fluid;
replacement of this cooling fluid with air.

Figure 4:
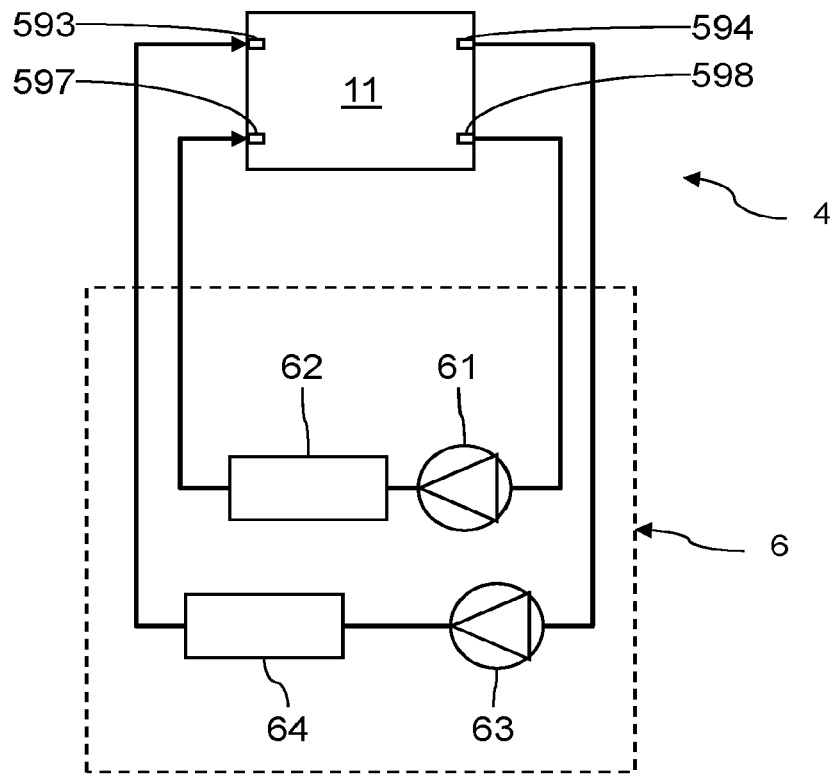
FIG. 4 illustrates schematically an example of a cooling and injection circuit for cooling fluid according to one variant of the invention.

FIG. 4 illustrates schematically an example of a cooling and injection circuit 6 for cooling fluid according to a variant of the invention. The cooling and injection circuit 6 is connected to a stack 11 of electrochemical cells. Here, the cooling and injection circuit 6 comprises an independent cooling and injection circuit for the cooling fluid of the seals 517 and 518. Here, the cooling and injection circuit 6 comprises another independent cooling and injection circuit for the cooling fluid of the median zone 52. This configuration typically corresponds to that described in detail referring to FIG. 2. The cooling fluid for median zone 52 may be different from that used for the seals 517 and 518.

The cooling and injection circuit 6 is in this case applied for a liquid cooling fluid. Here, the cooling circuit for the seals 517 and 518 comprises a pump 61 whose inlet is connected to the manifold 598. The cooling circuit for the seals 517 and 518 further comprises a heat exchanger 62, whose inlet is connected to the outlet of the pump 61. The outlet of the exchanger 62 is connected to the manifold 597. During operation of the fuel cell 4, the heat exchanger 62 is intended to dissipate the heat of the liquid coolant recovered at the level of a manifold 598. The liquid coolant introduced at the level of a manifold 597 therefore makes it possible to cool the peripheral seal 517 to keep it within in its temperature range of use.

In this case the cooling circuit for the median zone 52 comprises a pump 63 whose inlet is connected to the manifold 594. The cooling circuit for the median zone 52 further comprises a heat exchanger 64, whose inlet is connected to the outlet of the pump 63. The outlet of the exchanger 64 is connected to the manifold 593.

Figure 5:
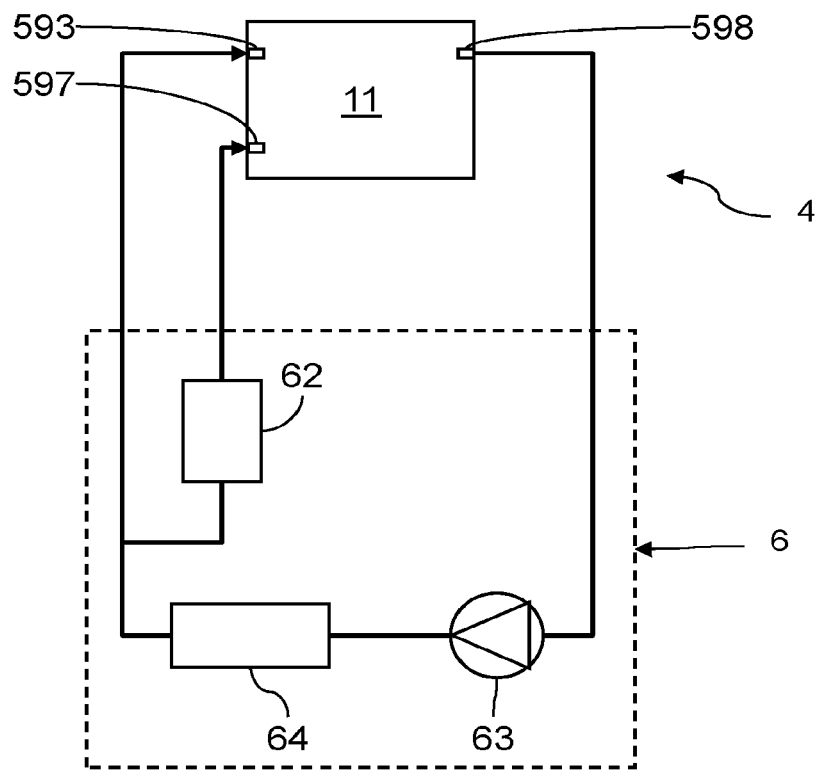
FIG. 5 illustrates schematically an example of a cooling and injection circuit for cooling fluid according to another variant of the invention.

FIG. 5 illustrates schematically an example of a cooling and injection circuit 6 for cooling fluid according to another variant of the invention. The cooling and injection circuit 6 is connected to a stack 11 of electrochemical cells. Here, the cooling and injection circuit 6 comprises a cooling and injection circuit for the cooling fluid of the seals 517 and 518, connected to the cooling and injection circuit for the median zone 52. The cooling fluid for the median zone 52 is in this case identical to that used for the seals 517 and 518. In this configuration, the circuits 53 to 56 are connected to manifold 594 rather than to manifold 598.

The cooling and injection circuit 6 is in this case applied for a liquid cooling fluid. The manifold 598 recovers liquid for cooling the seals 517 and 518 and liquid coolant for the median zone 52. The circuit 6 comprises a pump 63 whose inlet is connected to the manifold 598. The circuit 6 further comprises a heat exchanger 64, whose inlet is connected to the outlet of the pump 63. The outlet of the heat exchanger 64 is connected to the manifold 593, via a first branch. This first branch is intended to convey liquid coolant to the median zone 52 in the stack 11. The outlet of the heat exchanger 64 is, moreover, connected to the manifold 597, via a second branch. This second branch is intended to convey the liquid coolant of the seals 517 and 518 in the stack 11. This second branch includes a heat exchanger 62 arranged between the manifold 597 and the outlet of the heat exchanger 64.

The outlet of the exchanger 62 is connected to manifold 597. During operation of the fuel cell 4, heat exchanger 62 is intended to dissipate the heat of the liquid coolant recovered at the level of a manifold 598. The liquid coolant introduced at the level of a manifold 597 therefore makes it possible to cool the peripheral seal 517 to keep it within in its temperature range of use. Such a configuration notably makes it possible to use a heat exchanger 64 having larger dimensions than heat exchanger 62, and thus giving increased cooling of the liquid coolant.

Figure 6:
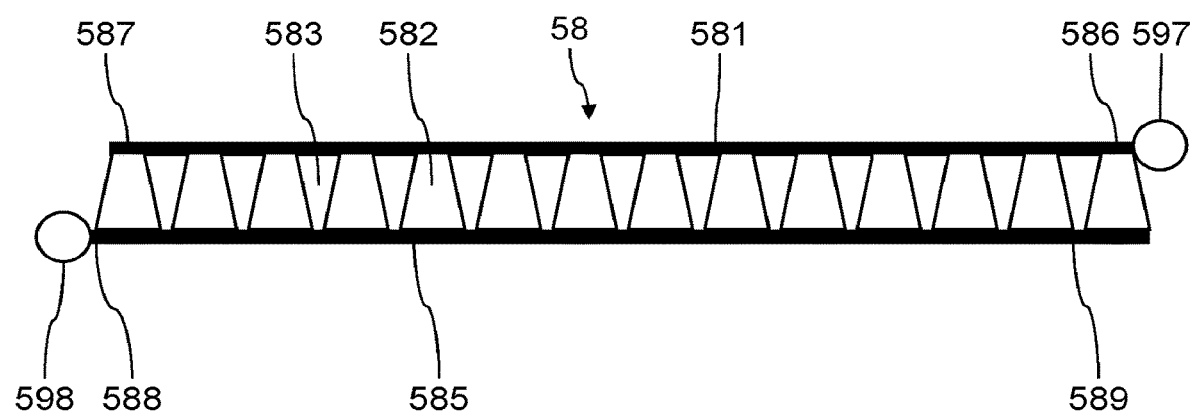
FIG. 6 illustrates schematically an intermediate cooling circuit for a fuel cell according to another embodiment of the invention.

FIG. 6 illustrates schematically an intermediate cooling circuit 58 for a fuel cell 4 according to another embodiment of the invention. The flow circuit 58 comprises a flow channel 581.

Circuit 58 (other circuits 58 may be distributed around the intermediate seal 518) has a first end 586 connected to the cooling fluid admission manifold 597, and a second end 587 opposite to end 586. The flow channel 581 extends parallel to one side of the peripheral seal 517, so that it is adjacent to the latter.

The flow circuit 58 also comprises a flow channel 585, having a first end 588 connected to the manifold for exhaust of cooling fluid 598, and a second end 589 opposite to end 588. The flow channel 585 extends parallel to one side of the intermediate seal 588, so that it is adjacent to the latter. The end 586 of the flow channel 581 is positioned near the second end 589 of the second flow channel 585.

Flow channels 583 are provided between flow channels 581 and 585. These flow channels 583 are distributed along the first flow channel 581 and connect each flow channel 581 to flow channel 585, so that a fluid introduced at the level of manifold 597 must pass through a flow channel 583 to return to manifold 598. The channels 583 are configured to induce pressure losses in a fluid flow between the flow channels 581 and 585, in order to promote the formation of a temperature gradient between these flow channels 581 and 585. Here, the flow channels 583 are delimited by walls 582 positioned between the channels 581 and 585, so as to limit the section of channels 583. Here, the walls 582 form a gradual narrowing of section from channel 581 to channel 585.

In the examples described above, the manifolds 591, 592, 595 and 596 are positioned in the intermediate zone 57. However, manifolds 591, 592, 595 and 596 encircled by seal 518 may also be envisaged. Seals 511, 512, 515 and 516 are then made of the same material as seal 518. If these seals 511, 512, 515 and 516 are not impervious at a storage temperature, it may be envisaged that the flow channels through which reactants are intended to pass are purged beforehand, prior to storage of the fuel cell 4, and therefore before these seals are cooled to a temperature below their range of use.

The invention has been described for an example in which the flow channels for liquid coolant for the seals 517 and 518 are positioned on an outer face of the bipolar plate 5. It may also be envisaged that flow channels of this kind are provided on the two outer faces of the bipolar plate 5. It may also be envisaged that these flow channels for cooling the seals 517 and 518 are provided inside the bipolar plate, hermetically with respect to the flow channels for liquid coolant of the active zone arranged in the median zone 52.

The invention is described in the foregoing for application to fuel cells. The invention also applies of course to other proton exchange membrane electrochemical reactors, for example electrolysers. In such a case, the bipolar plates 5 may be replaced with flow guides polarized at respective electrolysis voltages.

The invention is described in the foregoing for a fuel cell supplied with dihydrogen fuel. The invention also applies of course to fuel cells using other types of fuel, for example methanol.

The cooling fluid passing through the cooling circuits 53 to 56 may be one of the reactants passing through the median zone 52. It may then be envisaged that one of the reactants is introduced into circuits 53 to 56 via a manifold 597, recovered at the level of a manifold 598, and then reintroduced at the level of manifold 591 or 592 as applicable. It may also be envisaged that one of the reactants is recovered at the level of manifold 595 or 596 as applicable, and then introduced into circuits 53 to 56 via a manifold 597, after passing through a heat exchanger. A water recovery device may be included in circuit 6 if we only wish to reintroduce the gas phase at a reactant outlet.

The invention claimed is:
1. An electrochemical reactor, comprising:
   a flow guide;
   a membrane/electrode assembly;
   a peripheral seal arranged between the flow guide and the membrane/electrode assembly;
   wherein:
   an intermediate seal arranged between the flow guide and the membrane/electrode assembly, the intermediate seal being encircled by the peripheral seal and encircling a reaction zone of the electrochemical reactor;

at least one first flow circuit for cooling fluid arranged between the peripheral seal and the intermediate seal, the flow circuit comprising:

a first flow channel extending along the peripheral seal between a first end connected to a first manifold for cooling fluid and a second end opposite to the first;

a second flow channel extending along the intermediate seal between a first end connected to a second manifold of cooling fluid and a second end opposite to the first; and either a third flow channel connecting the respective second ends of the first and second flow channels, so that a fluid introduced at the level of the first manifold must pass through the third flow channel to return to the second manifold;

or fourth flow channels distributed along the first flow channel and connecting each first flow channel to the second flow channel, so that a fluid introduced at the level of the first manifold must pass through a fourth flow channel to return to the second manifold, the first end of the first flow channel being positioned close to the second end of the second flow channel, said fourth flow channels being configured to induce pressure losses in a fluid flow between the first and second flow channels.

2. The electrochemical reactor according to claim 1, wherein the peripheral seal and the intermediate seal of comprise different materials, the material of the peripheral seal comprising a temperature of −20° C. in its range of use, and the material of the intermediate seal including a temperature of 180° C. in its range of use.

3. The electrochemical reactor according to claim 1, wherein fifth flow channels for cooling fluid are provided inside a bipolar plate vertically in the reaction zone, the flow circuit for cooling fluid and the fifth flow channels for cooling fluid including one and the same cooling fluid.

4. The electrochemical reactor according to claim 2, wherein fifth flow channels for cooling fluid are in communication with third and fourth manifolds arranged in the reaction zone, the third and fourth manifolds being encircled by seals formed of the same material as the intermediate seal.

5. The electrochemical reactor according to claim 1, wherein the flow circuit for cooling fluid includes a cooling fluid selected from the group consisting of air, dihydrogen, water and glycol.

6. The electrochemical reactor according to claim 1, wherein the first manifold is closer to the peripheral seal than to the intermediate seal.

7. The electrochemical reactor according to claim 1, wherein the second manifold is closer to the intermediate seal than to the peripheral seal.

8. The electrochemical reactor according to claim 1, comprising several cooling fluid flow circuits arranged between the peripheral seal and the intermediate seal, similar to the first flow circuit for cooling fluid, the cumulative length of the first flow channels of these flow circuits being at least equal to 60% of the length of the peripheral seal.

9. The electrochemical reactor according to claim 1, wherein said first flow channel is arranged between the peripheral seal and said second flow channel.

10. A system comprising an electrochemical reactor according to claim 1, further comprising a compressor connected to the first and second manifolds, said compressor being configured for introducing compressed air at the level of the first manifold.

11. The system according to claim 10, further comprising a heat exchanger having an inlet connected to an outlet of the compressor and an outlet connected to said first manifold for cooling fluid.

12. The system according to claim 11, wherein the inlet of the compressor is connected to an exhaust manifold for cathodic reactant.

13. The system according to claim 10, wherein said cooling fluid is air, the flow of said cooling fluid through said first flow channel having a pressure loss less than that of the flow of said cooling fluid through said fourth flow channels.

* * * * *